(12) United States Patent
Jeung et al.

(10) Patent No.: US 11,925,891 B2
(45) Date of Patent: Mar. 12, 2024

(54) FILTRATION MEDIA WITH EXTENDED SURFACE AREA

(71) Applicants: SoonDeuk Jeung, Independence, MO (US); Yogesh Ner, Spring Hill, TN (US); Lu Liu, Crestwood, KY (US); Zhiwang Wu, Spring Hill, TN (US); Lei Li, Franklin, TN (US)

(72) Inventors: SoonDeuk Jeung, Independence, MO (US); Yogesh Ner, Spring Hill, TN (US); Lu Liu, Crestwood, KY (US); Zhiwang Wu, Spring Hill, TN (US); Lei Li, Franklin, TN (US)

(73) Assignee: PARKER-HANNIFIN CORPORATION, Cleveland, OH (US)

( * ) Notice: Subject to any disclaimer, the term of this patent is extended or adjusted under 35 U.S.C. 154(b) by 510 days.

(21) Appl. No.: 17/172,214

(22) Filed: Feb. 10, 2021

(65) Prior Publication Data

US 2021/0162333 A1 Jun. 3, 2021

Related U.S. Application Data

(63) Continuation of application No. PCT/US2019/045531, filed on Aug. 7, 2019.

(Continued)

(51) Int. Cl.
*B01D 39/16* (2006.01)
*B01D 46/00* (2022.01)
(Continued)

(52) U.S. Cl.
CPC ....... *B01D 46/523* (2013.01); *B01D 39/1623* (2013.01); *B01D 46/0001* (2013.01); *B01D 46/10* (2013.01); *B01D 2239/0654* (2013.01); *B01D 2239/0668* (2013.01); *B01D 2239/1291* (2013.01); *B01D 2275/10* (2013.01);
(Continued)

(58) Field of Classification Search
CPC .............. B01D 46/523; B01D 39/1623; B01D 46/0001; B01D 46/10; B01D 2239/0654; B01D 2239/0668; B01D 2239/1291; B01D 2275/10; B01D 2275/205; B01D 2279/60; B01D 2239/065; B01D 2239/0681;
(Continued)

(56) References Cited

U.S. PATENT DOCUMENTS 5,731,065 A * 3/1998 Stelzmuller ............ D04H 1/559
428/408
8,308,834 B2 11/2012 Smithies et al.
(Continued)

FOREIGN PATENT DOCUMENTS

CN 105195028 A 12/2017
CN 107974841 A 5/2018
(Continued)

*Primary Examiner* — Frank M Lawrence, Jr.
(74) *Attorney, Agent, or Firm* — Reinhart Boerner Van Deuren P.C.

(57) ABSTRACT

A filter media and methods are provided. The media is stretchable and exhibits a high degree of elongation which thereby extends its surface area during pleating. By extending surface area of media during pleating, the initial differential pressure is lowered as the area of media is stretched while keeping the same efficiency range with a compressed thickness of media on the affected area.

20 Claims, 4 Drawing Sheets

Related U.S. Application Data (60) Provisional application No. 62/717,296, filed on Aug. 10, 2018.

(51) Int. Cl.
*B01D 46/10* (2006.01)
*B01D 46/52* (2006.01)
*F02C 7/052* (2006.01)
*D01D 11/06* (2006.01)

(52) U.S. Cl.
CPC .... *B01D 2275/205* (2013.01); *B01D 2279/60* (2013.01); *D01D 11/06* (2013.01); *D10B 2331/10* (2013.01); *D10B 2505/04* (2013.01)

(58) Field of Classification Search
CPC ............ B01D 2239/1258; D01D 11/06; D10B 2331/10; D10B 2505/04

USPC .................................................. 55/521, 527
See application file for complete search history.

(56) References Cited

U.S. PATENT DOCUMENTS

| | | | |
|---|---|---|---|
| 9,446,547 | B2 | 9/2016 | Lustenberger |
| 9,511,330 | B2 | 12/2016 | Yu et al. |
| 9,795,902 | B2 | 10/2017 | Rogers et al. |
| 10,543,441 | B2 | 1/2020 | Jaganathan et al. |
| 2016/0361674 | A1* | 12/2016 | Swaminathan ........ B01D 39/04 |

FOREIGN PATENT DOCUMENTS

| | | |
|---|---|---|
| KR | 1020150079137 A | 7/2015 |
| KR | 101805323 B1 | 12/2017 |
| WO | WO 20170262289 A1 * | 2/2017 |
| WO | 2017/196653 A1 | 11/2017 |

\* cited by examiner

FILTRATION MEDIA WITH EXTENDED SURFACE AREA

This patent application is a continuation of PCT Application No.: PCT/US2019/045531, filed Aug. 7, 2019, which claims the benefit of U.S. Provisional Patent Application No. 62/717,296, filed Aug. 10, 2018, the entire teachings and disclosure of which are incorporated herein by reference thereto.

FIELD OF THE INVENTION

This invention generally relates to filtration media, and more particularly to filtration media useful in air filtration applications, for example, air intakes for gas turbines, or other industrial process applications.

BACKGROUND OF THE INVENTION

Gas turbine inlet filters are critical in protecting the internal componentry of gas turbine engines, and in maintaining the turbine's high performance by filtering out dust particles and foreign objects that can erode the blades of the turbine. Such gas turbine inlet filters are typically formed using a media which provides for good filtration efficiency to provide an acceptable life cycle.

Along with its filtering efficiency, the initial pressure drop of such gas turbine inlet filters is equally important to hold a designed filter service interval and contribute to energy savings and to keep constant air flow, normally 700,000 to 800,000 cfm, depending of course on the particular engine.

Unfortunately, it is difficult to satisfy both filtration efficiency and pressure drop targets simultaneously. Most prior designs attempt to solve this problem by utilizing a filter media that will provide for a low initial pressure drop, but usually sacrifice the efficiency of the filter media in doing so. As such, there is a need in the art for a filtration media which on the one hand provides a desirable filtration efficiency, while on the other hand also provides for a desirable initial pressure drop value.

The invention provides such a filtration media. These and other advantages of the invention, as well as additional inventive features, will be apparent from the description of the invention provided herein.

BRIEF SUMMARY OF THE INVENTION

In one aspect, the invention provides a filter media. An embodiment of such a filter media includes a backing layer and a filtration layer applied to the backing layer. The filtration layer is deposited onto the backing layer and comprises a thermoplastic polyurethane. The thermoplastic polyurethane has an elongation of about 50% to about 350%. The filter media has an elongation of about 20% to about 80%.

In certain embodiments according to this aspect, the filtration layer comprises a low molecular weight thermoplastic polyurethane and one of a high molecular weight thermoplastic polyurethane and a medium molecular weight thermoplastic polyurethane.

In certain embodiments according to this aspect, the backing layer is formed of one of polypropylene, bicomponent polyester, co-polyester, polyethylene-polyester bico material or moldable glass media. The backing layer has an air permeability of less than about 900 ft3/ft2/min. The backing layer has a sheet thickness of less than 1 mm.

In certain embodiments according to this aspect, the filtration layer comprises the low molecular weight thermoplastic polyurethane and the high molecular weight thermoplastic polyurethane. The low molecular weight thermoplastic polyurethane is about 60% by weight to about 99.75% by weight of the filtration layer and the high molecular weight thermoplastic polyurethane is about 0.25% by weight to about 40% by weight of the filtration layer.

In certain embodiments according to this aspect, the filtration layer comprises the low molecular weight thermoplastic polyurethane and the medium molecular weight thermoplastic polyurethane. The low molecular weight thermoplastic polyurethane is about 60% by weight to about 99.75% by weight of the filtration layer and the medium molecular weight thermoplastic polyurethane is about 0.25% by weight to about 40% by weight of the filtration layer.

In another aspect, the invention provides a filter element. An embodiment according to this aspect includes a filter media. The filter media has regularly spaced embossments about a surface of the filter media. The filter media includes a backing layer and a filtration layer deposited onto the backing layer, the filtration layer comprises a low molecular weight thermoplastic polyurethane and one of a high molecular weight thermoplastic polyurethane and a medium molecular weight thermoplastic polyurethane.

In certain embodiments according to this aspect, the filtration layer comprises the low molecular weight thermoplastic polyurethane and the high molecular weight thermoplastic polyurethane. The low molecular weight thermoplastic polyurethane is about 60% by weight to about 99.75% by weight of the filtration layer and the high molecular weight thermoplastic polyurethane is about 0.25% by weight to about 40% by weight of the filtration layer.

In certain embodiments according to this aspect, the filtration layer comprises the low molecular weight thermoplastic polyurethane and the medium molecular weight thermoplastic polyurethane. The low molecular weight thermoplastic polyurethane is about 60% by weight to about 99.75% by weight of the filtration layer and the medium molecular weight thermoplastic polyurethane is about 0.25% by weight to about 40% by weight of the filtration layer.

In yet another aspect, the invention provides a method for forming a block of pleated filter media. An embodiment of such a method includes unwinding a backing layer from a roll and feeding the backing layer through at least one forcespinning deposition process. The method also includes depositing, by said forcespinning deposition process, a filtration layer unto the backing layer. The method also includes pleating the filter media using pleating and embossing rolls which emplaces embossments into the filter media during pleating.

In certain embodiments according to this aspect, the step of depositing by the forcespinning deposition process includes using a solution comprising a low molecular weight thermoplastic polyurethane and one of a high molecular weight polyurethane and a medium molecular weight polyurethane.

In certain embodiments according to this aspect, the step of depositing by the forcespinning deposition process includes using a low molecular weight thermoplastic polyurethane and a high molecular weight polyurethane. The step of depositing by the forcespinning deposition process includes depositing fibers such that the low molecular weight thermoplastic polyurethane is about 60% by weight to about 99.75% by weight of the filtration layer and the high molecular weight thermoplastic polyurethane is about 0.25% by weight to about 40% by weight of the filtration layer.

In certain embodiments according to this aspect, the step of depositing by the forcespinning deposition process includes using a low molecular weight thermoplastic polyurethane and a medium molecular weight polyurethane. The step of depositing by the forcespinning deposition process includes depositing fibers such that the low molecular weight thermoplastic polyurethane is about 60% by weight to about 99.75% by weight of the filtration layer and the medium molecular weight thermoplastic polyurethane is about 0.25% by weight to about 40% by weight of the filtration layer.

Other aspects, objectives and advantages of the invention will become more apparent from the following detailed description when taken in conjunction with the accompanying drawings.

BRIEF DESCRIPTION OF THE DRAWINGS

The accompanying drawings incorporated in and forming a part of the specification illustrate several aspects of the present invention and, together with the description, serve to explain the principles of the invention. In the drawings.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

As described in greater detail below, embodiments of a filter media and method for forming the same are disclosed herein. Advantageously, the media is stretched and exhibits a high degree of elongation which thereby extends its surface area during pleating. By extending surface area of media during pleating, the initial differential pressure is lowered as the area of media is stretched while keeping the same efficiency range with a compressed thickness of media on the affected area.

The stretched media is dimensionally stabilized with glue so that it is applicable in both self-cleaning pulse and dust collecting depth filter applications. The increments of media linear length also contribute to the ability to collect more dust during application by creating small pockets along the side of pleat. The embodiments described herein are particularly applicable to the primary filter section in a filter house that normally requires a high performance filter rating, e.g. F8 to E12 under test standard EN779-2012.

Figure 1:
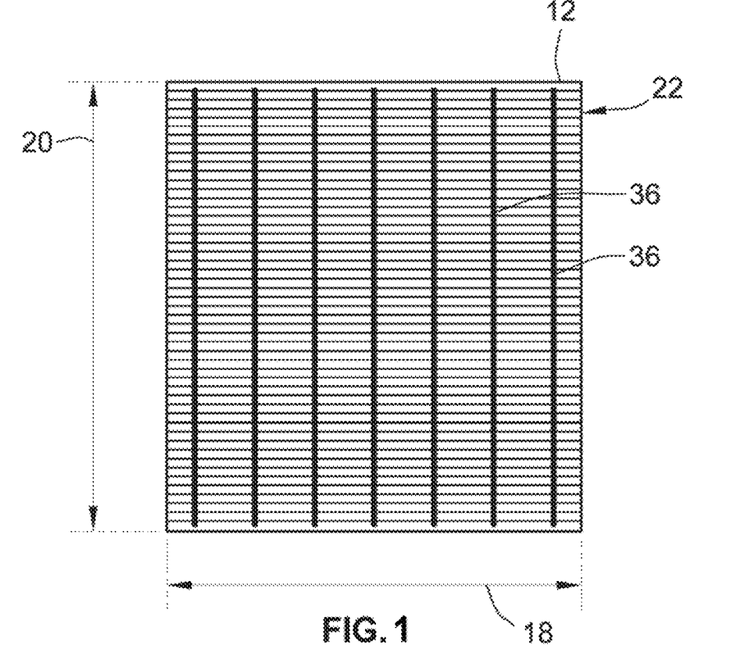
FIG. 1 is a frontal view of a rectangular filter media pack that may itself be used as a panel filter utilizing media according to the teachings herein.

Turning now to FIG. 1, the same illustrates a frontal view of filter media 12 according to the teachings herein, formed into a rectangular filter media pack 22 that may itself be used as a panel filter utilizing media according to the teachings herein. This filter media pack 22 can employ adhesive spacer beads 36 and media 12 having embossments such that the filter media pack 22 is ready to be framed via a frame for use to create the panel filter.

However, the above general description should be taken as a non-limiting example of the types of filter media packs which may be formed by the filter media defined herein. Indeed, the applicant has found that the filter media described herein may also be advantageously employed in other types of filter elements and filter media pack shapes, e.g. v-bank configurations, cylindrical configurations, trapezoidal configurations, or other filtration applications which typical utilized pleated filter media. Generally speaking, filter media 12 may have the same or similar construction and configuration as that shown and described in U.S. Pat. No. 10,730,001 to Tate et al., titled, "Filter With High Dust Capacity," the teachings and disclosure of which are incorporated herein in their entirety.

Without limiting the foregoing, for example media 12 may be shaped in a pleater process such that media 12 includes embossments. These embossments stretch the media, increasing its overall surface area. The degree of stretching, however, is dependent upon the elongation capabilities of the media itself. Advantageously, embodiments of media formed according to the teachings herein allow for such enhanced elongation properties. For non-limiting example, the Applicant has found that a filtration layer of media 12 can elongate from about 50% to about 350% under an elongation test performed per ASTM D5035, and the combined media 12 can elongate from about 20% to about 80% under an elongation test using ASTM D5035. The term "about" in the foregoing range denotes those tolerances known to those of skill in the art when performing tensile testing and other elongation type testing of filtration media. Further, unless otherwise noted herein, "elongation" means elongation at break.

The Applicant has also found that media 12 according to the teachings herein is F9 media in EN779:2012 but the range can be extended from fine (F) grade, F7 to F9 in EN799 OR EPA, E10 to E11 in EN1822. For the F9 grade, 70% at 0.4 um particle size is the minimum efficiency that is the lowest efficiency at initial pressure drop, discharged or the loading procedure of the test. At the same time, the average efficiency with 0.4 um particles should be equal or greater than 95% at 450 Pa maximum final test pressure drop. The air flow in EN779 is 3400 m3/h or specified in the similar rated range for the application.

Figure 2:
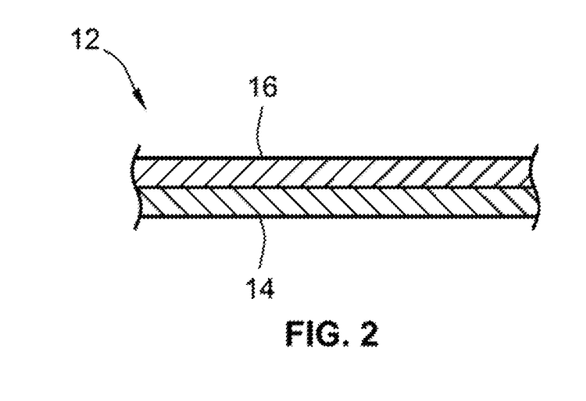
FIG. 2 is a side sectional view of the filter media of FIG. 1.

Turning now to FIG. 2, media 12 includes a backing layer 14 for structural support, and a filtration layer 16 supported by backing layer 14. The backing layer may for example be polypropylene spunbond, bicomponent polyester, co-polyester, polyethylene-polyester bico material or moldable glass media. Broadly, the backing layer 14 material can be thermoformable polyolefins, polyesters, polyamide, fluoro polymer group, moldable microglass with resins, bicomponent media or moldable cellulose media. Furthermore, the backing layer may have a thickness of less than 1 mm and air permeability of less than 900 ft$^3$/ft$^2$/min. While not shown, it is also contemplated that an additional scrim layer may be included to protect filtration layer 16. The scrim layer may, for non-limiting example, be formed of a spunbond or meltblown fiber layer of materials such as polypropylene, polyester, etc. Further, this scrim layer is relatively thin and has a weight of about 5 to about 30 gsm. It may also have an relatively open structure with an air permeability of about 300 to about 3000 cfm, and it also may be charged. Further, it is also contemplated that, in addition to simply being deposited onto backing layer 14, filtration layer 16 may be bonded to backing layer 14 using any contemporary bonding process, e.g. thermal bonding, ultrasonic bonding, adhesive bonding, etc. This allows for a more controlled spatial position of filtration layer 16 relative to backing layer 14.

Filtration layer 16 is deposited onto backing layer 14 using a method of centrifugal spinning method known as Forcespinning™ (herein referred to as a "forcespinning deposition process") as discussed below relative to FIG. 3. In the forcespinning deposition process, the fine fibers which are spun onto backing layer 14 to form filtration layer 16 begin as a polymer solution. Nanofibers are formed out of rotating spinneret through centrifugal force. The polymer solution is jetted in to air and attenuated to fibers by inertial shear forces. Fiber diameter ranges from 50 nm to 3 µm. The forcespinning deposition process involves centrifugally expelling a liquid polymer (in this case a polymer solution) through orifices in at least one spinneret while rotating the spinneret at a relatively high speed, e.g. typically a speed of at least 2500 rpms. This centrifugal action results in the drawing down of the fiber diameter of the fine fibers. It should be noted that the forcespinning deposition process draws down the diameter of the fine fiber using centrifugal forces.

Filtration layer 16 is thus formed from a solution which is composed of thermoplastic polyurethane (TPU) pellet, tetrahydrofuran (THF) and dimethylformaide (DMF). With respect, to the TPU constituent, the applicant has experimented with different concentrations and molecular weights of TPU in the same solutions. The applicant has found that a combination of two different grades of TPU are ideal for controlling elongation, in particular, a combination of high molecular weight TPU (e.g. Mw of about 200,000 Da to about 300,000 Da) and a low molecular weight TPU (e.g. Mw of about 20,000 Da to about 100,000 Da). The Applicant has found that the high molecular weight TPU has a high melt viscosity that slows a flow in the molten state and provides a low melt flow index (MFI). The Applicant has also found that it is possible to utilize a low molecular weight TPU and a medium molecular weight TPU (e.g. Mw of about 110,000 Da to about 199,000 Da) to achieve a similar result.

In general, the concentration of THF in the solution may be about 40% to about 60% by weight. The concentration of DMF in the solution may be about 20% to about 40% by weight. The concentration of low molecular weight TPU in solution may be about 10% to about 30%. This low molecular weight TPU may be combined with one of a high molecular weight TPU that is about 0.25% by weight to about 2% by weight of the solution, or a medium molecular weight TPU that is about 0.25% by weight to about 2% by weight of the solution, to achieve a combination of low and high or medium molecular weight TPU in solution. The term "about" in the foregoing concentrations is used to denote those tolerances known to those of skill in the art when preparing solutions for force-spinning applications. Additionally, it should be noted that those percentages of TPU listed above are the percentages by weight of the solution used to form filtration layer 16. As will be expected, the above mentioned solvents of the solution are not present in any appreciable amount in the fibers resulting from the forcespinning deposition process. As a result, filtration layer 16 composed of such force-spin fibers may comprise a combination of low molecular weight TPU of about 60% by weight to about 99.75% by weight of filtration layer 16 and a high molecular weight TPU of about 0.25% by weight to about 40% by weight of filtration layer 16. In an embodiment utilizing a blend of low and medium molecular weights, filtration layer 16 may comprise a combination of low molecular weight TPU of about 60% by weight to about 99.75% by weight of filtration layer 16 and a medium molecular weight TPU of about 0.25% by weight to about 40% by weight of filtration layer 16.

The basis weight of TPU nanofiber coating may for example be from 0.1 gram per square meter (gsm) to 30 gsm. As a result, backing layer 14 provides the required structural support for media 12, and thus remains associated with filtration layer 16 throughout manufacture and ultimate end-user application.

Table 1 below summarizes several examples of media formulations developed and tested according to the teachings herein. The acronym "MD" stands for machine direction, while the acronym "XD" stands for the cross or transverse direction. "Combined media" in Table 1 denotes filter media 12, i.e. backing layer 14 having filtration layer 16 installed thereon.

TABLE 1

| | | Media Examples | | | | | |
|---|---|---|---|---|---|---|---|
| | Unit | #1 | #2 | #3 | #4 | #5 | #6 |
| Tensile strength (MD) filtration layer only | lbf | 0.21 | 0.71 | 0.12 | NA | 1.26 | 1.30 |
| Tensile strength (MD) combined media | lbf | 1.95 | 0.60 | 7.82 | 9.52 | 3.99 | 2.85 |
| Tensile strength (XD) filtration layer only | lbf | 0.30 | 0.43 | 0.11 | NA | 1.25 | 1.31 |
| Tensile strength (XD) combined media | lbf | 1.61 | 1.03 | 5.85 | 9.74 | 2.78 | 4.08 |
| Elongation (MD) filtration layer only | % | 88 | 75 | 203 | NA | 61 | 132 |
| Elongation (MD) combined media | % | 30 | 56 | 40 | 52 | 47 | 58 |

TABLE 1-continued

|  | Unit | Media Examples | | | | | |
| --- | --- | --- | --- | --- | --- | --- | --- |
|  |  | #1 | #2 | #3 | #4 | #5 | #6 |
| Elongation (XD) filtration layer only | % | 68 | 84 | 189 | NA | 50 | 134 |
| Elongation (XD) combined media | % | 31 | 53 | 32 | 43 | 50 | 58 |
| Basis weight of filtration layer only | gram/m$^2$ | 20.7 | 23.5 | 6.7 | 0.5 | 12.7 | 16.5 |
| Basis weight of combined media | gram/m$^2$ | 72.2 | 37.5 | 111.7 | 110.4 | 61 | 58.4 |
| Air permeability of combined media | ft$^3$/ft$^2$/min | 5.2 | 2 | 33.1 | 73 | 2.6 | 11.5 |
| Basis weight of backing layer only | gram/m$^2$ | 52.5 | 12 | 105 | 110 | 48 | 47 |

Referring to Table 1, 6 samples of media 12 were manufactured and tested. Testing including tensile strength and elongation. Testing was conducted in the machine direction MD, as well as the transverse direction XD. Each of medial examples 1-6 are discussed in turn in the following. Of particular note, with formulations according to the invention, the Applicant has found that the elongation of filtration layer 16 which is formed of fine fibers possesses a greater elongation than the backing layer 14. In other words, it is the backing layer's elongation which limits the total elongation of the combined media. Such a characteristic of the backing layer limiting overall elongation is a marked departure from prior designs wherein the fine fiber layer limits the overall elongation of the combine media. Put differently, in those prior designs, the backing layer has a greater elongation than the fine fiber layer. As a result, such prior designs cannot survive a pleating process as described herein which is designed to stretch the media during pleating to increase surface area.

Example #1

Example 1 included a filtration layer 16 which was deposited onto backing layer 14 using the forcespinning deposition process. Filtration layer 16 was made from a solution of 29.05% DMF, 53.95% THF, 15.98% low molecular weight TPU, and 1.02% medium molecular weight TPU. The basis weight of this particular filtration layer was 20.7 gram/m$^2$. Backing layer 14 in example 1 was made of a polypropylene spunbond having a basis weight of 52.5 gram/m$^2$.

With the above formulation, the filter media 12 of example 1 had an air permeability of 5.2 ft$^3$/ft$^2$/min. As may be seen in Table 1, filter media 12 exhibited an elongation of 30% MD and 31% XD. As already mentioned above, this elongation characteristic is particularly relevant in that it allows filter media 12 to be stretched during processing so as to present a larger surface area of filtration.

Example 2

Example 2 included a filtration layer 16 which was deposited onto backing layer 14 using the forcespinning deposition process. Filtration layer 16 was made from a solution of 29.05% DMF, 53.95% THF, 15.98% low molecular weight TPU, and 1.02% medium molecular weight TPU. The basis weight of this particular filtration layer 16 was 23.5 gram/m$^2$. Backing layer 14 in example 2 was made of a polypropylene spunbond having a basis weight of 12 gram/m$^2$.

With the above formulation, the filter media 12 of example 2 had an air permeability of 2 ft$^3$/ft$^2$/min. As may be seen in Table 1, filter media 12 exhibited an elongation of 56% MD and 53% XD.

Example 3

Example 3 included a filtration layer 16 which was deposited onto backing layer 14 using the forcespinning deposition process. Filtration layer 16 was made from a solution of 29.4% DMF, 54.6% THF, 1.12% high molecular weight TPU, and 14.88% low molecular weight TPU. The basis weight of this particular filtration layer 16 was 6.7 gram/m$^2$. Backing layer 14 in example 3 was made of 110 gsm Lutradur® having a basis weight of 105 gram/m$^2$.

With the above formulation, the filter media 12 of example 3 had an air permeability of 33.1 ft$^3$/ft$^2$/min. As may be seen in Table 1, filter media 12 exhibited an elongation of 40% MD and 32% XD.

Example 4

Example 4 included a filtration layer 16 which was deposited onto backing layer 14 using the forcespinning deposition process. Filtration layer 16 was made from a solution of 29.4% DMF, 54.6% THF, 1.12% high molecular weight TPU, and 14.88% low molecular weight TPU. The basis weight of this particular filtration layer 16 was 0.5 gram/m$^2$. Backing layer 14 in example 4 was made of 110 gsm Lutradur® having a basis weight of 110 gram/m$^2$.

With the above formulation, the filter media 12 of example 4 had an air permeability of 73 ft$^3$/ft$^2$/min. As may be seen in Table 1, filter media 12 exhibited an elongation of 52% MD and 43% XD.

Example 5

Example 5 included a filtration layer 16 which was deposited onto backing layer 14 using the forcespinning deposition process. Filtration layer 16 was made from a solution of 29.05% DMF, 53.95% THF, 15.98% low molecular weight TPU, and 1.02% medium molecular weight TPU. The basis weight of this particular filtration layer 16 was 12.7 gram/m$^2$. Backing layer 14 in example 5 as made of a polypropylene spunbond having a basis weight of 48 gram/m$^2$.

With the above formulation, the filter media 12 of example 5 had an air permeability of 2.6 ft$^3$/ft$^2$/min. As may be seen in Table 1, filter media 12 exhibited an elongation of 47% MD and 50% XD.

Example 6

Example 6 included a filtration layer 16 which was deposited onto backing layer 14 using the forcespinning deposition process. Filtration layer 16 was made from a solution of 29.4% DMF, 54.6% THF, 1.12% high molecular weight TPU, and 14.88% low molecular weight TPU. The basis weight of this particular filtration layer 16 was 16.5 gram/m$^2$. Backing layer 14 in example 6 was made of polypropylene spunbond having a basis weight of 47 gram/m$^2$.

With the above formulation, the filter media 12 of example 6 had an air permeability of 11.5 ft$^3$/ft$^2$/min. As may be seen in Table 1, filter media 12 exhibited an elongation of 58% MD and 58% XD.

Figure 3:
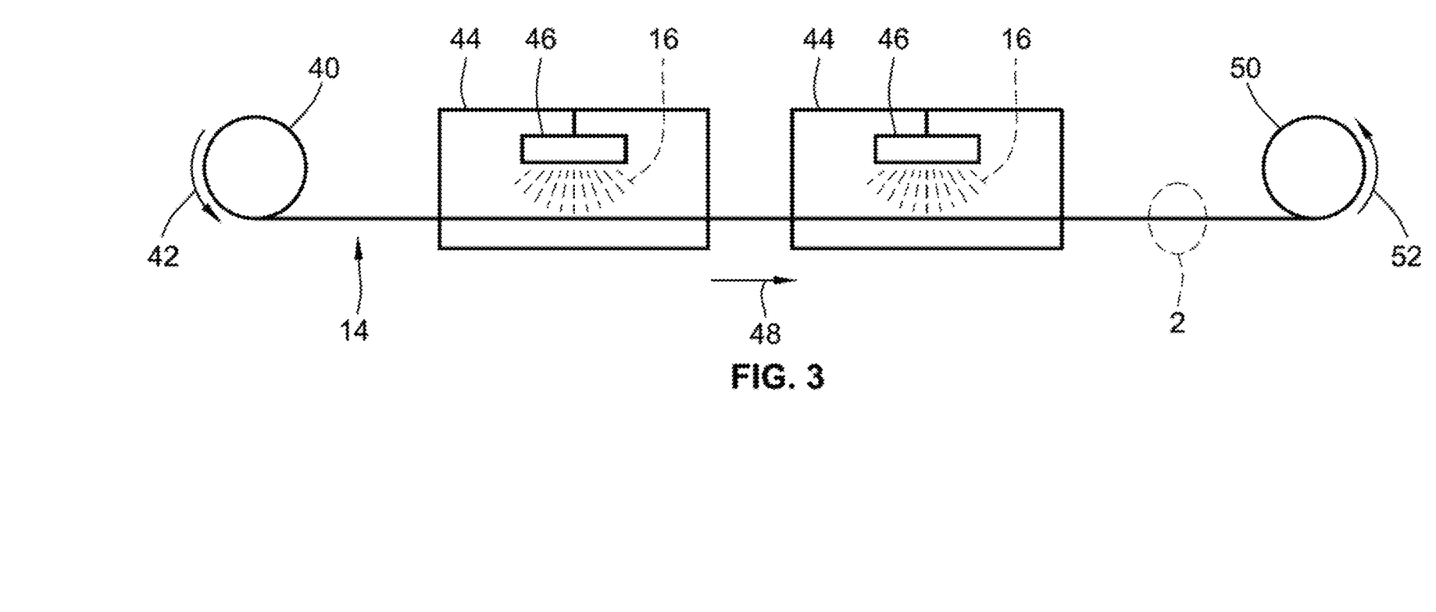
FIG. 3 is schematic view of a process and apparatus for creating the filter media of FIG. 1.

With particular reference to FIG. 3, the same illustrates a generally schematic view of how media 12 is created. In particular, a roll 40 of backing layer 14 is unwound in direction 42 and fed through a forcespinning arrangement that includes one or more forcespinning hoods 44. Each hood 44 includes a spinneret which is operable to generate nanofibers of filtration layer 16. The forcespinning deposition process has been successfully applied to make nanofibers with centrifugal forces from using high speed spinnerets (typically 4000 rpm to 9000 rpm). The configuration of these spinnerets is set so as to produce nanofibers either from solutions or molten polymeric materials. These nanofibers are then deposited onto backing layer 14. After deposition, media 12 is taken up into roll form 52 by winding the same in direction 52 as shown. A completed roll of media 12 may then be moved to a pleater, such as that described below relative to FIG. 4. Alternatively, media 12 may be fed directly into a pleater as described below, without winding media 12 back into a roll.

Figure 4:
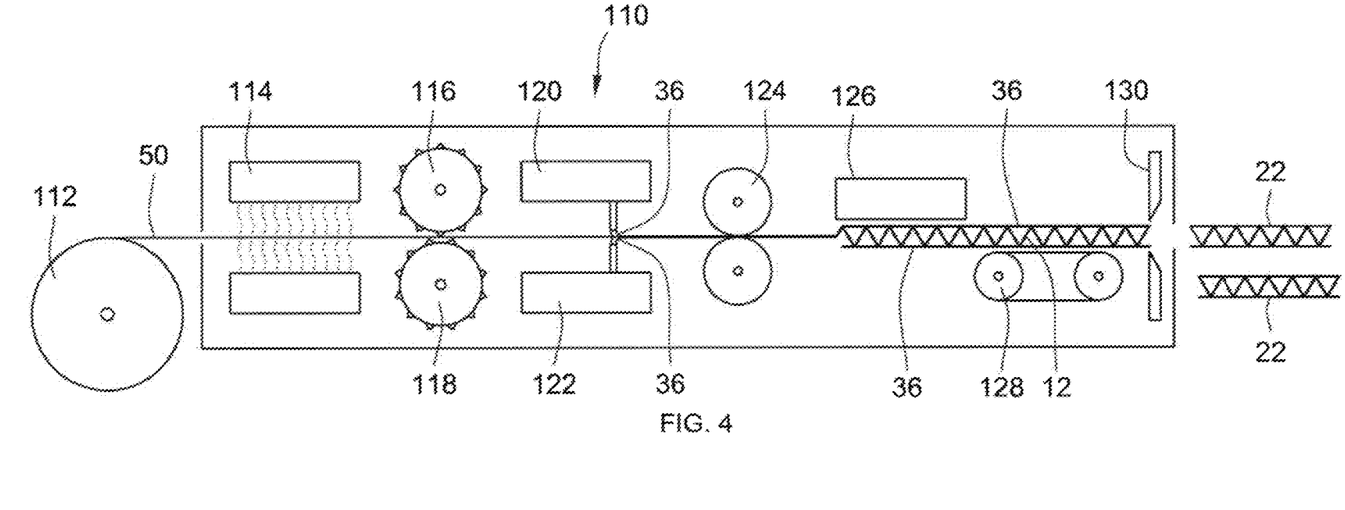
FIG. 4 is a schematic side elevation view of a pleater and method for forming the filter media according to the embodiments above.

With reference to FIG. 4, a method of pleating media 12 according to certain embodiments can be done on commercially available pleating and embossing machines as shown for example by pleater assembly 110 shown in FIG. 4.

The pleater assembly 110 has a tensioning assembly (not shown) to control sheet tension not shown that receives a continuous filter media sheet 50 of media 12 from roll 112. After coming off of the roll 112, the dimpled media sheet 50 passes through an oven to soften the media for embossing operations. Pre-heat settings play a role in process efficiency and filter performance and depends upon run line speed, so the oven temperature may not be as important as the media temperature. The heat softens the media, making it more malleable so that embosses can be imparted into the media such that the shape is retained. The heat and malleability of the media are set so that the media stretches rather than ruptures during the score/embossing process.

Once passing through the oven 114, the filter media is pulled through pleating and embossing rolls including top roll 116 and bottom roll 118 that are spaced apart relative to the thickness of the media. These rolls 116, 118 form the embossments for the adhesive spacer attachments and the scores for forming pleat tips and pleats.

The adjustable parameters associated with the set-up of the pleater rollers 116, 118 can greatly effect process efficiency and filter performance. As shown the pleater tooling is a set of driven precision steel rollers 116, 118 that are mounted perpendicular to web of filter media sheet 50. The rollers have embossment features incorporated into the rollers. Lengthwise slots are also machined into the rollers at prescribed arc lengths apart where score bars are mounted. The rollers also contain female mating surface that allow the meshing of the male embosses and score bars.

While conventional running of the pleating assembly 110 may be employed, the rollers 116, 118 can be adjusted in the following manner by adjusting the roller gap and adjusting the pleat score bars as necessary to generate deeper scoring independent of embossments and/or making shallower embossments in some circumstances. Other than these adjustments, conventional running of the pleater assembly 110 may be employed in terms of line speed and tensioning.

As to the roll gap, the distance between the two rollers 116, 118 can be adjusted. This adjustment determines the emboss and score depth imparted on the media. Varying the roller gap and emboss depth can reduce the emboss height imparted on the media. As the embosses become shallower: the required filter pleat count increases, the embosses become less defined and weaker (collapse under pressure easier) and embosses become less likely to be damaged by ruptured media. As embosses are adjusted to penetrate deeper: the embossments become taller which reduces the finished pleat count, the embossments become stronger as the shape is well formed into the media and the risk of media damage is increased.

The score depth is increased or decreased as the roller gap is adjusted. The score depth must be sufficient enough to initiate a fold during the pleat gathering process. The score depth can be adjusted independently of the roller gap settings. As to the efforts of preserving the "dimples" associated with the filter media sheet 50, the pleater roller gap between rolls 116, 118 may be adjusted.

Once passing through the rolls 116, 118, the media sheet 50 now scored and embossed passes through an adhesive applicator 120, 122 (top and bottom applicators) that applies suitable adhesive beads 36 (see also FIG. 1) typically at least over the score pleat tips on both upstream and downstream sides of the filter media sheet, in a continuous or discontinuous manner in rows that run transverse and preferably perpendicular to the pleat tips.

Pull rolls 124 eventually feed the sheet 50 to a folding section 126 that collects the pleats and forms the pleated filter media 12 with the adhesive beads shown schematically over the pleat tips. The pleated filter media 12 is then conveyed on a belt conveyor 128 and transported to a cutting station 130, where the continuous sheet is cut into the correct size and rectangular shape to become the rectangular filter media packs 22.

Figure 5A:
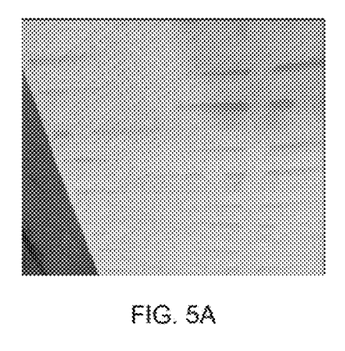
FIGS. 5A-5B are photographs of inlet and outlet faces of a sheet of filter media according to the teachings herein that has not yet been scored or pleated.
Figure 5B:
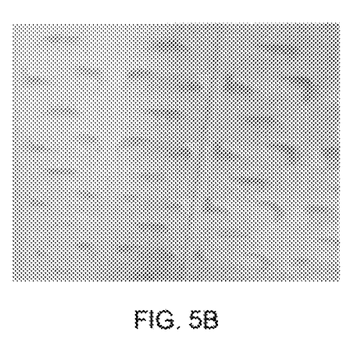

FIGS. 5A-5B is are photographs of inlet and outlet faces of a sheet of filter media according to the teachings herein that has not yet been scored or pleated.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter media, comprising:
a backing layer;
a filtration layer applied to the backing layer, the filtration layer deposited onto the backing layer and comprising thermoplastic polyurethane, wherein the filtration layer has an elongation of about 50% to about 350%; and
wherein the filter media has a combined elongation of about 20% to about 80%.

2. The filter media of claim 1, wherein the filtration layer comprises a low molecular weight polyurethane and one of a high molecular weight polyurethane and a medium molecular weight polyurethane.

3. The filter media of claim 1, wherein the backing layer is formed of one of polypropylene, bicomponent polyester, co-polyester, polyethylene-polyester bico material or moldable glass media.

4. The filter media of claim 3, wherein the backing layer has an air permeability of less than about 900 ft$^3$/ft$^2$/min.

5. The filter media of claim 3, wherein the backing layer has a sheet thickness of less than 1 mm.

6. The filter media of claim 2, wherein the filtration layer comprises the low molecular weight thermoplastic polyurethane and the high molecular weight thermoplastic polyurethane.

7. The filter media of claim 6, wherein the low molecular weight thermoplastic polyurethane is about 60% by weight to about 99.75% by weight of the filtration layer and the high molecular weight thermoplastic polyurethane is about 0.25% by weight to about 40% by weight of the filtration layer.

8. The filter media of claim 2, wherein the filtration layer comprises the low molecular weight thermoplastic polyurethane and the medium molecular weight thermoplastic polyurethane.

9. The filter media of claim 8, wherein the low molecular weight thermoplastic polyurethane is about 60% by weight to about 99.75% by weight of the filtration layer and the medium molecular weight thermoplastic polyurethane is about 0.25% by weight to about 40% by weight of the filtration layer.

10. A filter element, comprising:
a filter media, the filter media having regularly spaced embossments about a surface of the filter media;
wherein the filter media comprises:
a backing layer; and
a filtration layer deposited onto the backing layer, the filtration layer comprising a low molecular weight thermoplastic polyurethane and one of a high molecular weight thermoplastic polyurethane and a medium molecular weight thermoplastic polyurethane.

11. The filter element of claim 10, wherein the filtration layer comprises the low molecular weight thermoplastic polyurethane and the high molecular weight thermoplastic polyurethane.

12. The filter element of claim 11, wherein the low molecular weight thermoplastic polyurethane is about 60% by weight to about 99.75% by weight of the filtration layer and the high molecular weight thermoplastic polyurethane is about 0.25% by weight to about 40% by weight of the filtration layer.

13. The filter element of claim 10, wherein the filtration layer comprises the low molecular weight thermoplastic polyurethane and the medium molecular weight thermoplastic polyurethane.

14. The filter element of claim 13, wherein the low molecular weight thermoplastic polyurethane is about 60% by weight to about 99.75% by weight of the filtration layer and the medium molecular weight thermoplastic polyurethane is about 0.25% by weight to about 40% by weight of the filtration layer.

15. A method for forming a block of pleated filter media, comprising:
forming the filter media of claim 1 comprising the steps of:
unwinding a backing layer from a roll;
feeding the backing layer through at least one forcespinning deposition process;
depositing, by the forcespinning deposition process, the filtration layer unto the backing layer;
pleating the filter media using pleating and embossing rolls which emplaces embossments into the filter media during pleating.

16. The method of claim 15, wherein the step of depositing by the forcespinning deposition process includes using a solution comprising a low molecular weight thermoplastic polyurethane and one of a high molecular weight polyurethane and a medium molecular weight polyurethane.

17. The method of claim 16, wherein the step of depositing by the forcespinning deposition process includes using a low molecular weight thermoplastic polyurethane and a high molecular weight polyurethane.

18. The method of claim 17, wherein the step of depositing by the forcespinning deposition process includes depositing fibers such that the low molecular weight thermoplastic polyurethane is about 60% by weight to about 99.75% by weight of the filtration layer and the high molecular weight thermoplastic polyurethane is about 0.25% by weight to about 40% by weight of the filtration layer.

19. The method of claim 15, wherein the step of depositing by the forcespinning deposition process includes using a low molecular weight thermoplastic polyurethane and a medium molecular weight polyurethane.

20. The method of claim 19, wherein the step of depositing by the forcespinning deposition process includes depositing the fibers such that the low molecular weight thermoplastic polyurethane is about 60% by weight to about 99.75% by weight of the filtration layer and the medium molecular weight thermoplastic polyurethane is about 0.25% by weight to about 40% by weight of the filtration layer.

* * * * *